US00H002265H

(19) United States
(12) Statutory Invention Registration
Fouse et al.

(10) Reg. No.: US H2265 H
(43) Published: Dec. 6, 2011

(54) TRANSDUCER FOR MEASURING DYNAMIC TRANSLATION BY DIFFERENTIAL VARIABLE RELUCTANCE

(75) Inventors: Timothy M. Fouse, Colonial Beach, VA (US); Michael M. Canaday, King George, VA (US); Steven W. Mundell, Richmond, VT (US); John R. Bowen, Jr., Warsaw, VA (US); Michael John Hamel, Essex Junction, VT (US)

(73) Assignee: The United States of America as represented by the Secretary of the Navy, Washington, DC (US)

(21) Appl. No.: 11/805,264

(22) Filed: May 16, 2007

Related U.S. Application Data

(60) Provisional application No. 60/838,531, filed on Aug. 9, 2006.

(51) Int. Cl.
*G01L 5/14* (2006.01)

(52) U.S. Cl. ..... 73/167
(58) Field of Classification Search ..... 73/167
See application file for complete search history.

(56) References Cited

U.S. PATENT DOCUMENTS

| | | | | | |
|---|---|---|---|---|---|
| 4,813,435 | A | | 3/1989 | Arms | 128/774 |
| 5,383,368 | A | | 1/1995 | Franke et al. | 73/775 |
| 5,497,147 | A | * | 3/1996 | Arms et al. | 340/870.35 |
| 5,777,467 | A | | 7/1998 | Arms et al. | 342/207.18 |
| 6,463,813 | B1 | | 10/2002 | Gysling | 73/862.59 |
| 6,499,368 | B2 | | 12/2002 | Arms et al. | 73/866.15 |
| 6,647,253 | B2 | * | 11/2003 | Yamamoto | 455/311 |
| 2005/0093537 | A1 | * | 5/2005 | Townsend et al. | 324/207.18 |

* cited by examiner

*Primary Examiner*—Daniel Pihulic
(74) *Attorney, Agent, or Firm*—Gerhard W. Thielman

(57) ABSTRACT

A differential variable reluctance transducer (DVRT) is provided to measure a translation parameter, such as acceleration and/or deceleration of a test projectile. The DVRT, contained in a canister of the projectile, includes a cylindrical housing and an electronics module. The housing defines a cavity containing insulation and a bobbin around which a wire coil is wrapped. The housing has an attachment end and a distal end that faces the acceleration indicator. The bobbin is disposed substantially collinear to the housing. The wire coil is helically disposed around the bobbin. The insulation fills the remainder of the cavity. The electronics module receives electric current from the wire coil and connects to a data recorder.

10 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

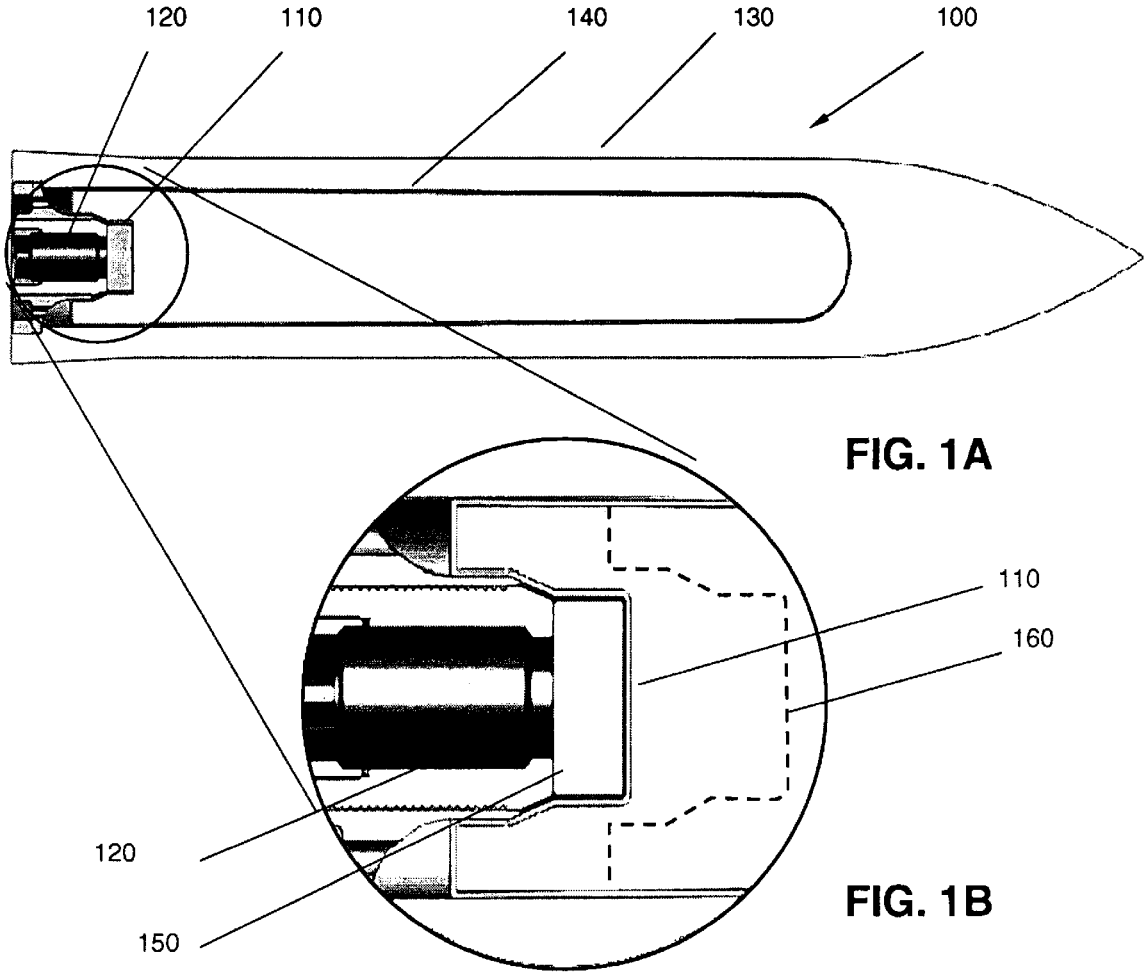
FIG. 1A
FIG. 1B
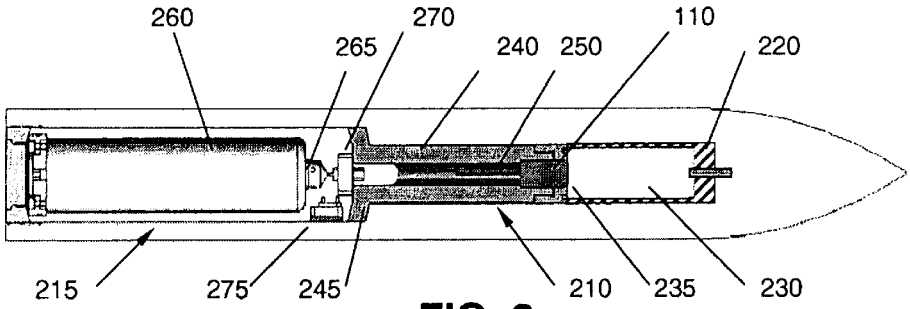
FIG. 2

TRANSDUCER FOR MEASURING DYNAMIC TRANSLATION BY DIFFERENTIAL VARIABLE RELUCTANCE

CROSS-REFERENCE TO RELATED APPLICATION

Pursuant to 35 U.S.C. §119, the benefit of priority from provisional application 60/838,531, with a filing date of Aug. 9, 2006, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to instrumentation for measuring acceleration in a gun-launched projectile, and more particularly to a fuse-mounted differential variable resistance transducer disposed aft of the simulated warhead.

Destruction of underground hardened targets may require deep penetration munitions. Such devices can include gun-launched projectiles. Tests to correlate penetration depth with deceleration of an instrumented shell into a simulated target may incorporate displacement sensors, such as accelerometers and proximity detectors. A Hall effect probe, which responds to Lorentz force reaction to a magnetic field perpendicular to the current flow, represents an exemplary proximity sensor without physical contact with a neighboring object. Further details on these principles can be found in http://hyperphysics.phyastr.gsu.edu/hbase/magnetic/hall.html.

In the presence of a magnetic field, the path of an electric current curves perpendicular to the magnetic field due to the Lorentz force producing an asymmetric distribution of charge density across the Hall effect probe or device that generates an electric potential. In response to voltage applied across two terminals of the Hall device, a third terminal provides a voltage proportional to the induced current. Hall devices have no mechanically moving parts and thus provide enhanced reliability in extreme environments, such as for projectiles subject to high accelerating and decelerating conditions.

SUMMARY

Conventional test devices yield disadvantages addressed by various exemplary embodiments of the present invention. In particular, a test projectile for propelled ejection from a launch mechanism is used to evaluate penetration into a concrete target. The projectile includes a casing having a cavity bore, an explosive simulant disposed at a fore end of the bore, an instrumentation canister aft of the simulant and rigidly mounted to the casing, and a data recorder. The bore is substantially coaxial with the casing's longitudinal centerline. The canister includes an electronic displacement measuring instrument that faces a conductive aft surface of the simulant. The instrument provides an electronic signal to measure a translation parameter supplied to the recorder.

Preferably, a differential variable reluctance transducer (DVRT) represents the instrument for measuring the translation parameter, such as acceleration and/or deceleration, of the explosive stimulant contained in the projectile warhead. As employed in the specification and claims, the term "acceleration" encompasses both positive (i.e., velocity increasing) acceleration and negative (i.e., velocity decreasing) deceleration, unless otherwise indicated.

In various exemplary embodiments, the test projectile is used to evaluate penetration into a concrete target. The projectile includes the DVRT that includes a cylindrical housing and an electronics module. The housing defines a cavity containing insulation and a bobbin around which a wire coil is wrapped.

Various exemplary embodiments provide for the housing as having an attachment end and a distal end that faces the acceleration indicator. The bobbin is disposed substantially parallel to the housing. The wire coil is helically disposed around the bobbin. The insulation fills the remainder of the cavity. The electronics module receives electric current from the wire coil and terminates in an electrical connector to a data recorder. A cable connects the housing to the electronics module.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 1A and 1B are elevation and detail views of a fuse in a munitions shell;

FIG. 2 is an elevation view of the munitions shell;

DETAILED DESCRIPTION

Figure 3:
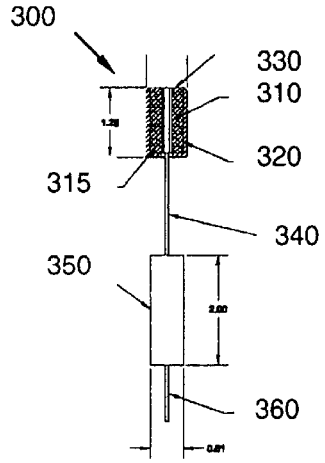
FIG. 3 is a cross-sectional assembly view of a first embodiment of a DVRT.

In the following detailed description of exemplary embodiments of the invention, reference is made to the accompanying drawings that form a part hereof, and in which is shown by way of illustration specific exemplary embodiments in which the invention may be practiced.

These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Efforts to improve shock hardening of the Hall device for a penetration test projectile or shell 100 have yielded improvements described in the embodiments described herein. An illustration of a forward portion of the projectile 100 is shown in FIG. 1A. The projectile 100 includes a booster 110 within which a differential variable reluctance transducer (DVRT) fuse (or sensor) 120 may be disposed. The fuse 120 includes the Hall device. Exemplary non-contact DVRT devices are provided by MicroStrain®, Inc. at Williston, Vt., such as various models cursorily described at http://www.microstrain.com/ncdvrt.aspx. The projectile 100 includes an outer case or housing 130 composed of hardened 4340-steel and being 4-inches in diameter, for example. The booster 110 is disposed aft of the breech end of a forward cavity 140.

A detail of the booster 110 is shown in FIG. 1B. A booster charge 150 may be disposed within the booster's internal cylindrical cavity and forward of the fuse 120. The projectile 100 may be enveloped in a sabot (see FIG. 9A) to enable launch from a large-caliber gun for achieving higher velocity than otherwise. Upon impact with a penetration target after being fired from a gun, the projectile 100 decelerates, retarding its velocity through the target. Forward momentum during the projectile's deceleration causes the booster 110 to translate into the cavity 140 as indicated by the dash outline 160.

FIG. 2 shows an overall elevation view of the projectile 100. The projectile's forward end includes a fore bore 210 that comprises the cavity 140. The projectile's aft end includes a larger diameter aft bore 215 through which the instrumentation components may be installed for assembly. The fore and aft bores 210, 215 may be substantially collinear with the projectile's longitudinal-axis-of-symmetry centerline.

The forward bore 210 may include a nylon insert 220 into which an explosive simulant 230 may be disposed. The insert 220 may then be threaded into the cavity 140. In this example, the simulant 230 is 1.5 inches in diameter and 3.5 inches in height and may be composed of gelatinous material having analogous mass properties of AFX-757 explosive. The aft side of the simulant 230 facing the DVRT fuse 120 may be covered by four layers aluminum tape, thereby presenting a highly conductive face layer 235.

A DVRT canister 240 may be disposed aft of the insert 220 and the simulant 230. The DVRT canister 240 may be secured to the casing of the projectile 100 by a radially extending flange 245. The DVRT fuse 120 may be disposed within a tube 250 within the DVRT canister 240. A recorder canister 260 may be disposed within the aft bore 215 to contain a data recorder. An accelerator mount 265 with a data coupling transfer interface may connect the recorder canister 260 with accelerometer transducers 270, 275 for longitudinal and transverse directional velocity changes, respectively.

The DVRT canister 240 houses the DVRT fuse 120 together with circuitry for electronic demodulation and signal conditioning. The sensor coils may be disposed in the forward end of the canister 240. The circuitry may be packed among glass impact beads in the middle of the canister 240 for shock resistance. The data recorder can typically record four channels of data at a sample rate of 8.6 μs (microseconds) per channel in high shock environments up to ±50,000 G.

The data recorder, in conjunction with the DVRT, operates on an alkaline 10.5 $V_{dc}$ (volts-direct-current) battery pack and stores data for 48 hours providing time to recover the projectile 100. The accelerator mount may contain a piezoresistive 200 kG accelerometer to sense the G (Earth's-gravitational-acceleration-at-mean-radius-equivalent) levels. The accelerometer may be mounted on a 10 kHz low-pass mechanical (polysulfide) filter to reduce ringing and mitigate against damage. The instrumentation may be calibrated to an accuracy of 0.0005 inch to measure distance between the DVRT fuse 120 and the simulant aft face layer 235.

The DVRT transducer operates on the principle of comparing signals from a pair of coils for sense and compensation. When the face of the transducer is brought in close proximity to a ferrous or highly conductive material, the reluctance of the sense coil changes, while the compensation coil acts as a reference. High frequency alternating current (AC, e.g., sine wave) excitation (e.g., by an oscillator) drives the coils, and a sensitive demodulator measures the differential reluctance of the coils. Reluctance represents the opposition in a circuit to magnetic flux from the induced electric current by ratio of the magnetic potential difference to the corresponding flux.

Differencing the outputs from the two coils provides a sensitive measure of the position, while canceling variations caused by temperature drift. Ferrous targets change the sense coils'reluctance by altering the magnetic circuit's permeability. By contrast, conductive targets (e.g., aluminum) operate by the interaction of eddy currents induced in the target's skin (i.e., aft face layer 235) with the magnetic field around the sense coil.

Although the DVRT measures linear displacement, the electronics in the DVRT recorder can differentiate the displacement with respect to time to obtain velocity, and can further differentiate the velocity with respect to time to obtain acceleration. Thus, the system may measure and record a translation parameter that includes at least one of displacement, velocity and acceleration of the gap.

This gap distance between the aft face layer 235 of the simulant 230 and a forward face of the booster 110 may be substantially negligible upon installation. For this configuration, the calibration voltage may be between about 3-to-5 $V_{dc}$. After acceleration on launch and deceleration on target impact, the simulant 230 may deformably compress, while the DVRT fuse 120 remains fixed within the projectile 110 by the flange 245 and a threaded ring behind the recorder 260. The relative motion between the layer 235 and the booster 110 increases the separation therebetween. The Hall effect technique enables accurate measurement to about 10 $mV_{dc}$ corresponding to an effective distance of about 0.3 inch.

Figure 4:
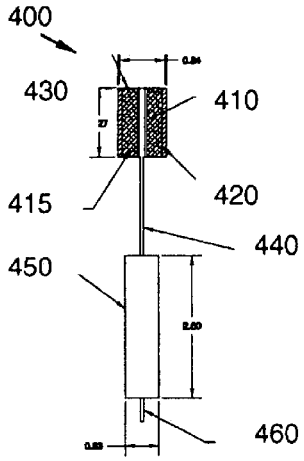
FIG. 4 is an analogous view of a second embodiment of a DVRT.
Figure 5:
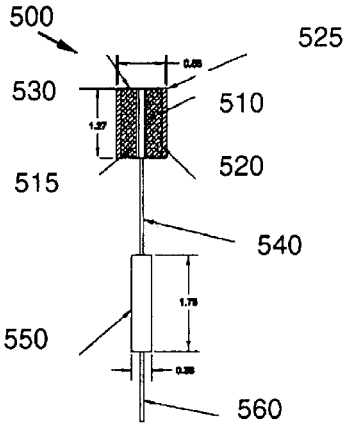
FIG. 5 is an analogous view of a third embodiment of a DVRT.

FIGS. 3, 4 and 5 show cross-sectional elevation views of assemblies for progressive DVRT fuse embodiments. Alternate methods of measuring deceleration lack high frequency capability necessary for shell penetration tests, and conventional Hall devices are vulnerable to shock.

FIG. 3 shows a first DVRT embodiment 300. The first embodiment includes a bobbin 310 having a hollow center surrounded by a scotch-cast epoxy 315 contained within a cylindrical housing 320 that defines a cavity containing the bobbin 310 and the epoxy that otherwise fills the cavity's interior and acts as an insulator. The housing 320 has an open distal end 330 that faces an accelero-meter target or indication component, such as in the simulant 230.

The housing 320 has a diameter of 0.75 inch and a length of 1.25 inches. A wire sense coil (see FIG. 6) is helically wrapped around the bobbin 310 and surrounded by epoxy 315. The wire coil carries the current for sensing changes in the magnetic field from which acceleration and/or deceleration may be determined. The housing 320 and the bobbin 310 have longitudinal axes substantially proximate and parallel to each other. Thus, the bobbin 310 may be substantially collinear with a longitudinal centerline axis of the axisymmetric housing 320. The housing 320 lacks grooves or screw-threads to hold the epoxy 315.

A cable 340 having a diameter of 0.070 inch and a length of 10 inches connects the housing 320 from an attachment end opposite the distal end to an electronics module 350 having a diameter of 0.61 inch and a length of 2.00 inches terminated by a #24 American Wire Gauge (AWG) hookup 360 for electrical conduction. The electronics module 350 communicates with the housing 320 for receiving induced voltage potential from the wire coil. The electronics module 350 communicates with a data recorder by means of the hookup 360. Deficiencies in the first embodiment's physical integrity led to further refinements.

FIG. 4 shows a second DVRT embodiment 400. The second embodiment includes a bobbin 410 having a hollow center surrounded by a scotch-cast epoxy 415 contained within a cylindrical housing 420 covered at its distal end by a membrane 430 having a thickness of 0.020 inch. A wire coil (see FIG. 6) is helically wrapped around the bobbin 410. The housing 420 has a diameter of 0.90 inch and a length of 1.27 inches. The housing 420 includes grooves cut into its inside surface.

The membrane 430 and the grooves in the housing 420 inhibit ejection from the housing 420 of the wire coil within the epoxy 415. Alternatively, the housing 420 may incorporate ridges (instead of grooves) on its inside surface to increase structural integrity there. The larger diameter of the housing 420 as compared to the first embodiment housing 320 enables the sensor coil's diameter to be enlarged, thereby increasing sensitivity and range.

A 440 cable having a diameter of 0.070 inch and a length of 2.5 inches connects the housing 420 to an electronics module 450 having a diameter of 0.61 inch and a length of 2.60 inches terminated by a #24 AWG hookup 460. The membrane 430 and the housing grooves inhibit ejection from the housing 420 of the wire coil within the epoxy 415. The shorter cable 440 between the fuse and the electronics module reduces impedance.

FIG. 5 shows a third DVRT embodiment 500. The third embodiment includes a bobbin 510 having a hollow center surrounded by a Stycast® epoxy 515 contained within a cylindrical housing 520 covered at its distal end by a membrane 530 having a thickness of 0.030 inch. A wire coil (see FIG. 6) is helically wrapped around the bobbin 510. The housing 520 has a diameter 525 of 0.94 inch and a length of 1.27 inches. The housing 520 and the membrane 530 may preferably be composed of a non-magnetic metal, such as 316-stainless steel.

The larger diameter 525 of the housing 520 as compared to the first and second embodiment housings 320, 420 enables the sensor coil's diameter to be enlarged, thereby increasing sensitivity and range of travel for the fuse 120. The housing 520 includes grooves cut into its inside surface. The membrane 530 and the housing grooves inhibit ejection from the housing 520 of the wire coil within the epoxy 515. A cable 540 having a diameter of 0.065 inch and a length of 2.5 inches connects the housing 520 to an electronics module 550 having a diameter of 0.38 inch and a length of 2.50 inches terminated by a #24 AWG hookup 560.

The lessened mass and volume of the electronics module 550 reduces the stress imposed on the cable 540 and the hookup 560. In combination, these design augmentations for the third embodiment 500 enable impact of the projectile 100 from an 8-inch gun into a concrete target at decelerations of 8.5 kG (kilo-gravity-accelerations) for a duration of 18 ms (milliseconds) on launch and 4-to-6 kG on impact for a duration of 20 ms.

Figure 6:
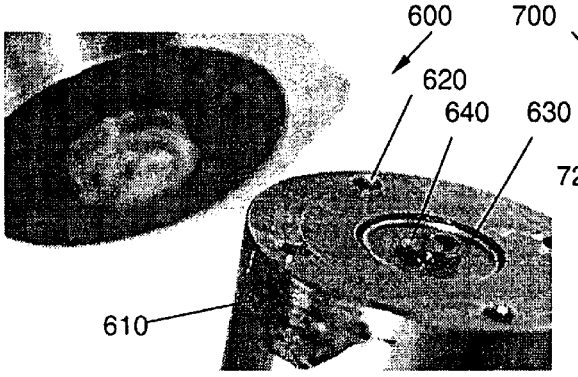
FIG. 6 is a perspective view of the first embodiment of the DVRT.
Figure 7:
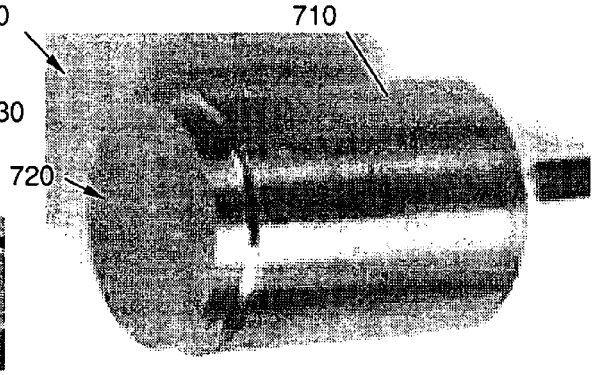
FIG. 7 is a perspective view of the third embodiment of the DVRT.

FIG. 6 shows a DVRT fuse 600 in perspective view from a photograph for the first embodiment 300. The fuse 600 includes a housing 610 having an open end 620. The housing 620 includes a wire coil 630 around a bobbin 640. FIG. 7 shows a DVRT fuse 700 in perspective view from a photograph for the third embodiment 500. The fuse 700 includes a housing 710 having cover 720 that conceals the wire coil and bobbin.

Figure 8:
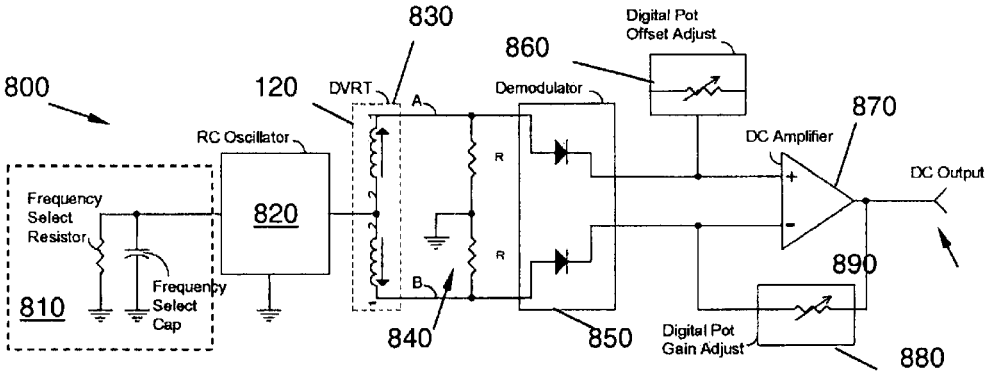
FIG. 8 is a schematic view of a circuit diagram for the DVRT.

FIG. 8 shows a circuit diagram 800 of the DVRT system in the canister 240. The diagram includes a frequency selector circuit 810, a resistance-capacitor (RC) oscillator 820, a DVRT Wheatstone bridge 830 and 840, a demodulator 850, a digital potentiometer offset adjuster 860, a DC instrumentation amplifier 870, a digital potentiometer gain adjuster 880 and a DC output 890.

The frequency of the RC oscillator 820 can be selected via values for the resistor and capacitor of the selector 810 connected in parallel. The RC oscillator provides signal stability (in frequency and/or amplitude) against influence by mechanical forces. An example oscillator integrated circuit is LTC6900 from Linear Technology in Milpitas, Calif. having acceptable drift and acceleration insensitivity for gun-projectile test purposes. The oscillator 820 generates an AC signal that drives an inductor pair 830 from a center tap. A grounded resistance, pair 840 combined with the inductor pair 830 forms a DVRT Wheatstone bridge.

Signals A and B at the ends of the DVRT Wheatstone bridge may be demodulated and amplified to provide the DC voltage output 890 as being proportional to the logarithm of the distance to the target, e.g., the aft face layer 235. The demodulator includes a matching pair of semiconductor diodes in parallel connecting the Signals A and B to the positive and negative inputs of the DC amplifier 870. The semiconductor diodes can be chosen to have matched characteristics. The offset potentiometer 860 removes offset voltages from the demodulator's output. Gain of the amplifier 870 may be selected using the gain potentiometer 890.

The frequency of the AC excitation may be selected to operate the DVRT below its self-resonant frequency, yet high enough to provide a reasonable load impedance to the oscillator for a given DVRT inductance. This AC excitation may be fed to a center tap in the inductance pair 830, where the measurement coil and the reference coil connect together. In addition, the resistance coils terminate together in the resistance pair 840, with the two connections forming the Wheatstone bridge.

In the absence of a metallic target within the measurement range of the DVRT, the inductance of the measurement coil equals that of the reference coil, thereby producing no differential signal. A metallic target (e.g., the aft face layer 235) in the proximity of the DVRT fuse 120 changes the inductance of the measurement coil resulting in voltage differences between Signals A and B.

These signals may be demodulated or rectified to remove the high frequency AC component. This process yields a differential DC signal that may be approximately proportional to the logarithm of the proximity distance to the target and the measurement coil. The DVRT may be designed so that ambient temperature variations affect both reference and measurement coils equally, thereby cancelling temperature effects on distance measurements.

Figure 9A:
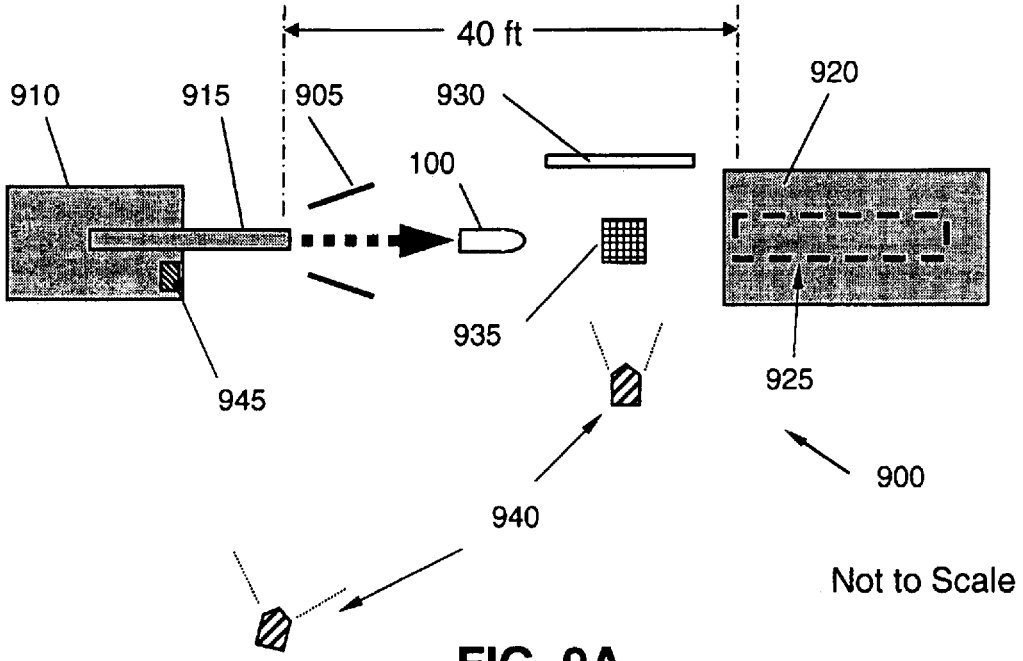
FIG. 9A is a plan view of a gun-launch munitions test configuration.
Figure 9B:
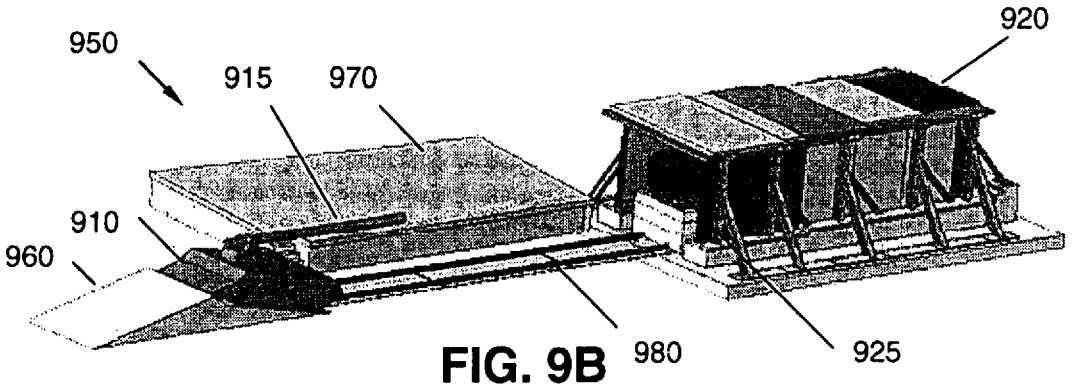
FIG. 9B is an isometric view of the gun-launch munitions test configuration.

FIGS. 9A and 9B show plan and isometric views of a gun-launch penetration test configuration (not to scale). The plan depiction 900 illustrates the test projectile 100 and sabot petals 905 that separate therefrom. A self-propelled M110A2 howitzer (gun) 910 fires a 203 mm (8-inch) sabot-encased shell from a barrel 915 towards a terminal facility 920 that contains a target 925.

Upon launch, the sabot petals 905 separates to release the projectile 100 traveling at between 2500 ft/sec and 4000 ft/sec a distance of 40 feet past a video backdrop 930 and an angle-of-attack mirror 935. High-speed cameras 940 visually record the projectile's travel, while a radar transmitter and receiver 945 on the gun 910 uses Doppler measurements for complementary tracking data.

The isometric illustration 950 shows the gun 910 positioned on a ramp 960 for stability. The barrel 915 points to the target 925 located in the facility 920. The gun 910 and the facility 920 are flanked by a platform 970 and are separated by a rail track 980 onto which the target 925 may be positioned.

Figure 10A:
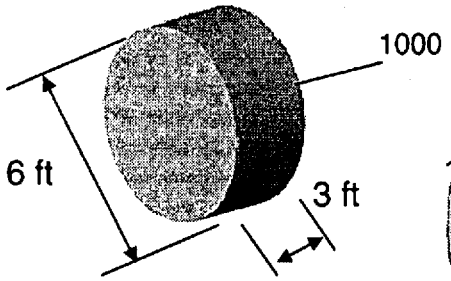
FIG. 10A is an isometric view of a target coupon module.
Figure 10B:
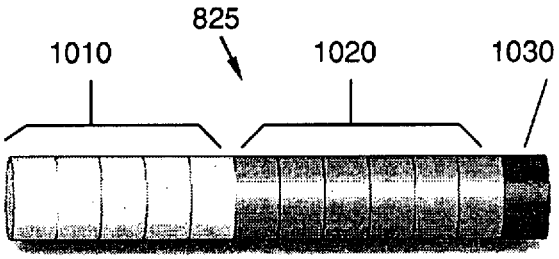
FIG. 10B is an elevation view of the target composed of several target coupon modules.

FIGS. 10A and 10B show isometric and elevation views of a concrete target module 1000. Each cylindrical module 1000 comprising a portion of the target 825 may be 6 feet in diameter and 3 feet in length. The target 825 may include an initial impact portion 1010, an intermediate portion 1020 and a terminal portion 1030.

The initial impact portion 1010 is composed of cellular concrete having a density of 90 lb/ft$^3$ (pounds-mass-per-cubic-foot) and an unconfined compressive strength (UCS) of 3000 psi (pounds-force-per- square-inch). UCS is used for borability predictions and is based on the ASTM-D2938 standard. The intermediate portion 1020 is composed of low strength having a density of 125 lb/ft$^3$ and a UCS of 3300 psi.

The low-strength concrete is based on a formula from the Engineer Research and Development Center (ERDC) of the U.S. Army Corps of Engineers. The terminal portion 1030, which may include only a single module, may be composed of high-strength concrete having a density of 150 lb/ft$^3$ and a UCS of 9000 psi.

Figure 11:
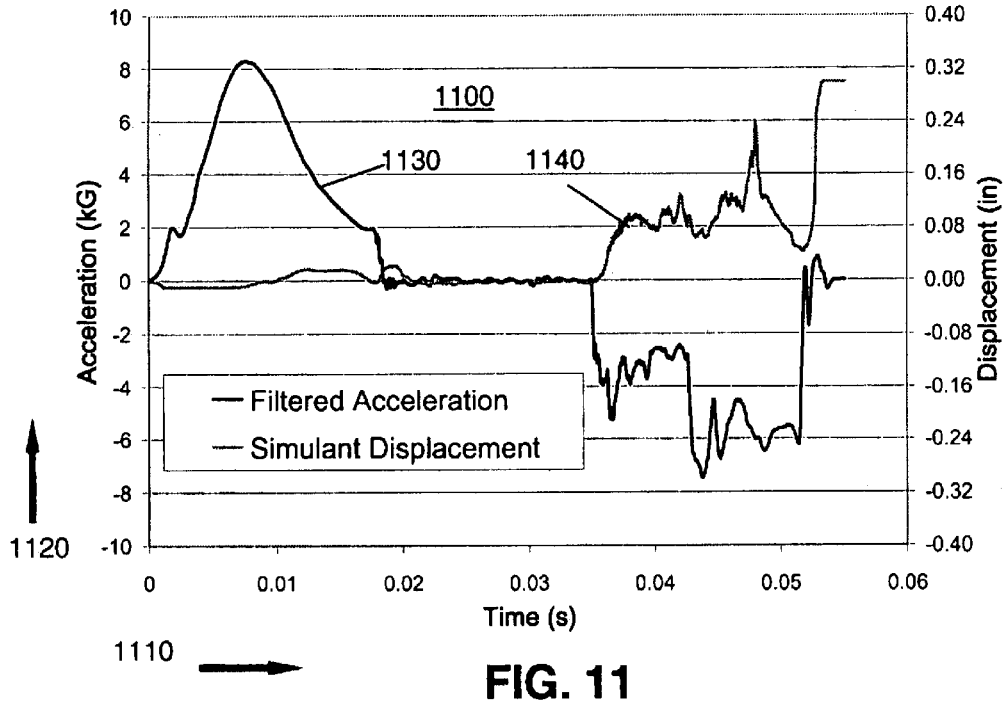
FIG. 11 is plot diagram showing measured filtered acceleration vs. measured simulant displacement with respect to time.
Figure 12:
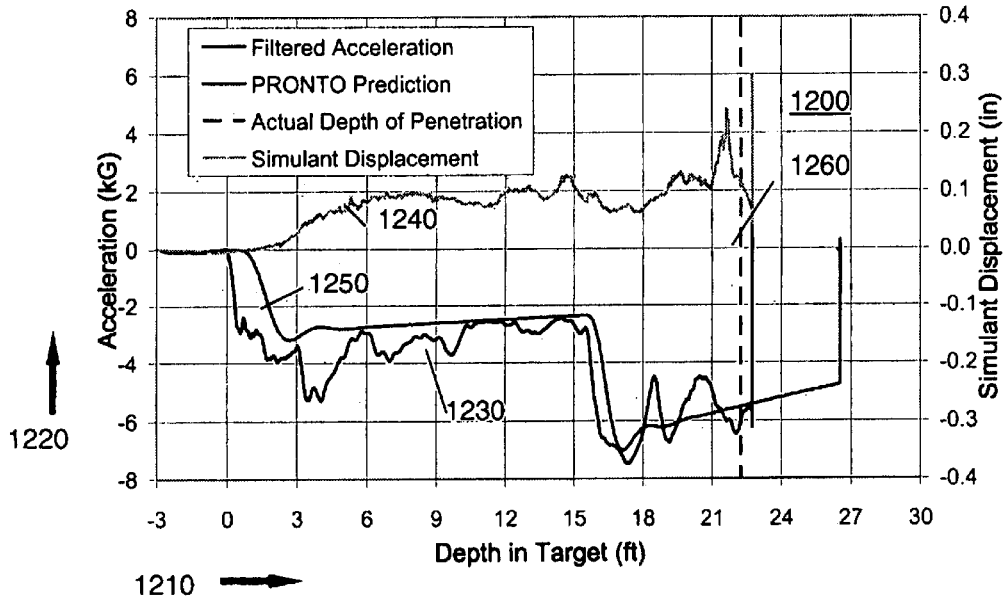
FIG. 12 is plot diagram showing measured filtered acceleration vs. predicted munitions acceleration with respect to target penetration depth, and vs. measured simulant displacement.

FIGS. 11 and 12 show acceleration plots 1100, 1200 for the projectile 110 penetrating into the target 825. For the first plot 1100, the abscissa 1110 represents time (sec), while the ordinate 1120 represents acceleration (kG). The acceleration-time plot 1100 illustrates acceleration measurements shown as a trace 1130 that are filtered for transient noise and a trace 1140 for displacement of the stimulant 230.

For the second plot 1200, the abscissa 1210 represents penetration depth (feet) into the target, while the ordinate 1220 represents acceleration (kG). The acceleration-depth plot 1200 illustrates acceleration measurements shown as a trace 1230 that are filtered for transient noise and a trace 1240 for displacement of the stimulant 230. Additionally, the plot 1200 shows a prediction trace 1250 using a transient dynamics finite element code named PRONTO used for smooth particle hydrodynamics (SPH) predictions. The plot 1200 also denotes a dash line 1260 showing the actual depth of penetration for the test about 22 feet.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A differential variable reluctance transducer (DVRT) for measuring a translation parameter of a neighboring component in a high-acceleration environment, the DVRT comprising:

a cylindrical housing that defines a cavity containing a bobbin substantially collinear with the housing, a wire coil helically disposed around the bobbin, an insulation otherwise filling the cavity, the housing having a distal end and an attachment end;

a membrane that covers the distal end of the housing;

an electronics module for receiving an electric signal from the wire coil, the electronics module terminating in an electrical connector to a data recorder; and a cable connecting the housing to the electronics module, wherein the electronics module provides a direct current (DC) output and comprises:

a frequency selector including a resistance and capacitor connected in parallel to a selection input;

a signal oscillator that receives the selection input from the frequency selector to produce a signal input;

an inductance-resistance Wheatstone bridge that receives the signal input from the signal oscillator at a junction tap of an inductor pair;

a demodulator that receives calibration and measurement signals from the Wheatstone bridge; and a DC amplifier that receives and differences the calibration and measurement signals and that sends the electronic signal as the DC output.

2. The DVRT according to claim 1, wherein the housing and the membrane are comprised of stainless steel.

3. The DVRT according to claim 1, wherein the insulation is comprised of epoxy.

4. The DVRT according to claim 1, wherein the housing includes grooves along a surface of the cavity, the grooves being in physical contact with the insulation.

5. The DVRT according to claim 1, wherein the housing has a longitudinal length of 1.27 inches and a diameter of 0.94 inch, and the cable has a length of 2.5 inches.

6. The DVRT according to claim 1, wherein the translation parameter is one of displacement, velocity, acceleration and deceleration.

7. The DVRT according to claim 1, wherein the signal oscillator is a resistance-capacitance (RC) oscillator.

8. The DVRT according to claim 1, wherein the demodulator includes a matching pair of semiconductor diodes in parallel.

9. The DVRT according to claim 1, further comprising:

an offset potentiometer that connects between an output from the demodulator and an input to the amplifier.

10. The DVRT according to claim 1, further comprising:

a gain potentiometer that connects between an output from the demodulator and the DC output.

* * * * *